United States Patent
Scalf

(10) Patent No.: US 6,481,375 B1
(45) Date of Patent: Nov. 19, 2002

(54) REPAIRABLE BIRD FEEDER

(76) Inventor: Clyde Cordell Scalf, 3514 E. Bailey Rd., Deer Park, WA (US) 99206

( * ) Notice: Subject to any disclaimer, the term of this patent is extended or adjusted under 35 U.S.C. 154(b) by 0 days.

(21) Appl. No.: 09/861,412

(22) Filed: May 18, 2001

(51) Int. Cl.$^7$ .............................................. A01K 39/01
(52) U.S. Cl. ...................... 119/52.2; 119/57.8; 119/429
(58) Field of Search .............................. 119/52.2, 57.8, 119/428–429, 430, 431, 432, 470, 474, 482, 484, 491, 492, 498, 499, 469; 446/106, 108, 110, 476, 478

(56) References Cited

U.S. PATENT DOCUMENTS

| | | | | |
|---|---|---|---|---|
| 3,696,792 A | * | 10/1972 | Bruhns | 119/428 |
| 3,757,742 A | * | 9/1973 | Schlegel | 119/432 |
| 4,086,876 A | * | 5/1978 | Moore et al. | 119/246 |
| 4,334,501 A | * | 6/1982 | McDaniel et al. | 119/475 |
| 4,892,060 A | * | 1/1990 | Lundquist | 119/52.2 |
| 5,413,069 A | * | 5/1995 | Currie | 119/52.2 |
| 5,551,371 A | * | 9/1996 | Markey et al. | 119/165 |
| 5,771,839 A | * | 6/1998 | Marsh | 119/52.2 |
| 5,829,382 A | * | 11/1998 | Garrison | 119/52.2 |
| 5,943,981 A | * | 8/1999 | Chrisco | 119/428 |
| 5,950,565 A | * | 9/1999 | Guyot | 119/447 |
| 6,116,189 A | * | 9/2000 | Rundle | 119/51.5 |

OTHER PUBLICATIONS

A.S. WebSales Corporation. BirdandYard.com. Birdfeeders & Outdoor Prodcuts. p. 1–6 2002 http://www.birdandyard-.com/feeders/hopper.htm.
A.S. WebSales Corporation. BirdandYard.com Bird Feeders & Outdoor Products. p. 1–4 2002 http://birdandyard.com/feeders/wood2.htm.
A.S. WebSales Corporation. BirdandYard.com. Bird Feeders & Outdoor Products p. 1–6 2002 http://www.birdandyard-.com/feeders/wood3.htm.
A.S. WebSales Corporation. BirdandYard.com Bird Feeders & Outdoor Products p. 1 2002 http://www.birdandyard.com/feeders/wood4.htm.
Wild Birds Forever. Wood Hopper Bird Feeder Collection p. 1–3 2002 http://www.birdsforever.com/pg000003.html.
Wild Birds Forever. Professional Series Bird Feeders. p. 1–3 2002 http://www.birdsforever.com/profeer.html.
Wild Birds Forever. Platform Feeders. p. 1–3 2002 http://www.birdsforever.com/messfree.html.
Wild Birds Forever. Copper Top Bird Feeder Collection. p. 1–4 2002 http://www.birdsforever.com/copper.html.
Wild Birds Forever. Decorative Redwood Songbird Lanterns. p. 1–3 2002 http://www.birdsforever.com/lanterns.html.
Cnature.com. Wood Feeders. 10 pages. 2002 http://www.c-nature.com/cgibn/shop.cgi/page=wlfeeders.htm/SID=1020710339.6987.

* cited by examiner

Primary Examiner—Yvonne R. Abbott
(74) Attorney, Agent, or Firm—Perkins Coie LLP

(57) ABSTRACT

A feeder including a seed platform, a plurality of end panels, a plurality of side panels and a roof structure. In one embodiment, roof panels and chimneys fitted with removable chimney caps form a roof structure for the feeder. Feed may pass through the chimneys and feeder throats before reaching the seed platform. The feeder throats can have access ports that include feed regulators. In one aspect of this embodiment, a bin separator is located bilaterally between at least two of the end panels, the bin separator fixedly secured to two throat keepers and at least one of the side panels. In a further aspect of this embodiment, an anchor block can secure the seed platform and the plurality of feeder throats.

10 Claims, 3 Drawing Sheets

REPAIRABLE BIRD FEEDER

CROSS-REFERENCE TO RELATED APPLICATIONS:

"Not Applicable"

STATEMENT REGARDING FEDERALLY SPONSORED RESEARCH OR DEVELOPMENT

"Not Applicable"

REFERENCE TO A MICROFICHE APPENDIX:

"Not Applicable"

BACKGROUND OF THE INVENTION

This invention relates to animal feeders and particularly to a bird feeder for dispensing loose fill seed and having two independent seed compartments, incorporating a ventilation system that is manufactured into the chimney caps. The feeder will accommodate large birds like grouse and will dispense loose fill seed varying in composition and size at a controlled rate by the use of seed regulators. The present invention also relates to a feeder that is easily filled and by the virtue of its integrated parts will allow for expansion and contraction of wood parts along its central axis and is easily repaired if damaged. Furthermore the roof panels where they join, is sealed with silicone as are the chimneys where they attaches to the roof. By the addition of placing chimney caps on the chimneys and water proofing the roof, outside of the chimney and chimney cap the roof becomes a waterproof structure therein keeping the seed and grain dry.

I have been feeding wild birds, in the country now for approximately 12 years. The birds that I feed are those that inhabit woodlands with pastures, brush and numerous wetland areas, one to two acres in size. A large majority of the birds that I feed are large in size such as quail, flickers, woodpeckers, young pheasants, red winged black birds and grouse not to mention the smaller species. The process of this invention started with the grouse one winter when they decided to eat the young dormant buds from my fruit trees. Five grouse, in a short period of four weeks, ruined, by eating or breaking off, next years fruit crop from 45 fruit trees.

I had built birdfeeders when I was a kid and I realized that if I provided feed for the grouse that they might prefer the feeder rather than the fruit trees. I went to all of the stores in my area, 16 in all, hoping to find a feeder that would be large enough and durable enough to withstand constant and rugged use. All of the feeders I encountered were quite small and would not hold very much seed. I also noticed that they were constructed in a manner that would not hold up to sever climate changes and were often built of plastic and metal. Plastic and metal feeders would work however the perches were also constructed of the same material and were small in size. I knew that they would heat up in the summer and in the winter would freeze to the ambient temperature thereby burning or freezing the feet of birds, rendering the feeder useless and causing unnecessary harm and damage to the animals and birds. A natural wood perch would be the best way to handle this issue and I could have adapted a perch to work.

I consequently asked a friend of mine, who had a lot of birdfeeders, which ones he liked and hoped he could help me. His feeders were primarily made of plastic and one was metal and they had very severe problems that he showed me. The plastic feeders would break down in the sunlight and be virtually worthless in 2 years and he could not find replacement parts. The metal feeder held a large volume of feed however the seed was continually rotting due to condensation build up and finally after 3 years, rust had rendered the feeder non-functional. We both agreed that the type of birdfeeder I was looking for was not available.

I immediately built a large capacity feeder with a feeding platform that was covered by a roof. The original bird feeder was comprised of wood boards, ¾inch in thickness and of varying widths for the roof, chimney, side panel and ends. The seed platform was made from ⅝-inch plywood of exterior grade. I used plywood for the seed platform due to its characteristics of not splitting or cupping and its ability to resist decomposition and blowing up by being made with exterior grade glue. The surfaces of the roof, chimney and chimney cap were coated with two applications of marine spar varnish wherein only the exposed, outside surfaces are varnished. The remainder of the bird feeder should not receive any protective coating or finish because it could possibly harm the birds by direct ingestion or contamination of the seed by contact. The feeder was placed on a wood pole six feet above the ground and positioned at the edge of my orchard.

Using cracked corn the following winter, I was able to attract the grouse to the feeder by placing corn and alfalfa pellets on a piece of plywood placed next to the seed platform of the feeder. In a few days they were actively using the feeder and staying out of the orchard. It was well worth it, as damage to my fruit tress from the grouse was reduced by over 75%.

That following summer an inherent problem of large bird feeders was quite evident. I could not keep my chickens out of the feeder. They simply gobbled up all of the wild bird food and corn. Instead of building fences and all types of deterrents, I thought that by designing a bird feeder that is large enough for a ruffled grouse to perch on and feed, yet small enough that a chicken could not perch on the platform, would be a sound solution to the problem.

The seed platform was cut down in size and the side panels angled outward, hopefully to keep the chickens from feeding from the platform, yet still allowing them to pick up what seed was scattered or spilled. The next hurdle was to determine if the grouse would be able to use the seed platform or if it would be too small to accommodate their size. The grouse never returned that winter. However, I discovered that the bird feeder, through one summer, fall and winter was completely ruined by the elements and the birds themselves. I would put out suet cakes for the flickers and woodpeckers in the fall and winter and the woodpeckers pecked holes in the side panels of the seed bins the size of quarters. The wood on the roof and side panels was warped, split, cupped and at the junction of the two horizontal side panels, the joint had separated and seed was spilling onto the platform. The chimney came apart and was detached from the roof. The plywood seed platform however was in good condition. I used exterior grade plywood due to its characteristics of not delaminating. It does not tend to split the way wood boards do and has the ability to securely anchor wood screws.

It was during this time that I started looking at the bird feeders on the market and I quickly observed that most bird feeders could not physically facilitate the feeding of large wild birds. I also observed small seed bins with small or non-regulating seed access ports and most were structurally flimsy being made of plastic that deteriorates in the sun. I continued to watch the designs in bird feeders as they came onto the markets and did not see any other bird feeders like mine.

I decided that summer that I would re-design the original bird feeder and eliminate the problems associated with the weather, type of building material, the dispensing of variable sized seed. The new feeder varied from the original in the fact that it was completely made from exterior grade ⅝-inch plywood, two wood blocks, glue and screws. The seed platform was enlarged sideways, the side panels were sloped more to the outside and the end panels were enlarged. The grouse had access to both the re-designed and original feeders. They were placed in close proximity to each other and contained the same type of seed. I believed that the grouse would go to the feeder that would best facilitate their feeding habits.

That following winter the feeders were a host to a multitude of migrating birds, large and small. The grouse came back that winter, and as expected, preferred the feeders to the orchard. The platform of the new plywood feeder was large enough to allow adult grouse to perch and obtain all the seed they required. Four grouse could feed at one time at the feeder. The feeders were filled via a single chimney and the seed, contained in a single feed bin, was dispensed out through four feeder ports, measuring approximately four inches long by ¾ inch high. The seed bin contained alfalfa pellets and cracked corn for the grouse, and smaller seed for the remainder of birds comprised of Niger thistle, milo, black sunflower seed, sunflower meats and other small seed. I also placed suet cakes with seeds on the roof of the feeder for feeding the flickers, woodpeckers, and nuthatches. The seed and grain was often inconsistently dispensed, denying the smaller birds access to their type and quantity of seed. The grouse wasted a lot of seed and I observed that smaller birds require and preferred different types and quantity of seed than larger birds.

Moisture became a problem that summer, when the orchard sprinklers would come on and the feeders would get completely soaked. In a couple of days the seed would start to rot. Consequently, I designed the chimney cap so that it would allow air to circulated through the seed and remove the water vapor. The platform was also redesigned to allow the addition of wood sticks to retain the seed on the platform yet still allow standing water to run off the seed platform due to the fact when the seed platform became wet it warped longitudinally and shed the water away from the seed bins.

Water continued to present a problem because the orchard sprinklers would completely soak the feeders and consequently would rot the seed. I left the two feeders in this arrangement because it provided an opportunity to test the effects of wet and dry cycles, every three to four days, which became invaluable in re-designing a new feeder. People, for the most part, buy bird feeders to observe the activity and feeding habits of birds. The yard around a house is the most likely location for a bird feeder, which is subjected to the same effects often produced by a lawn sprinkler.

By the following summer the original bird feeder and the plywood feeder were in rough condition. When examining the original feeder it was easy to see that the roof and chimney were warped and split. The holes in the wood side panels were enlarged by the wood flickers and woodpeckers to such a degree that the seed would pour out of them. The side panels were also warped, cupped and split and where the side panels made contact with the seed platform, water damage or dry rot occurred to the side panels where the seed is dispensed. Moisture was condensing inside the seed bin and ruining the seed as well as the feeder itself.

The re-designed plywood feeder also suffered damage from moisture and direct water contact. However, the damage was much less severe. The roof panels had warped and a gap along the ridge had opened up. This action loosened the chimney to the point where it was no longer attached to the roof. This condition allowed water to penetrate into the seed bin and contaminate the seed. The side panels had warped away from feeder throats and small seed would spill onto the seed platform. Other than these items, the bird feeder was in good condition. The plywood seed platform was in good condition and showed little sign of warping or splitting and securely held the component parts together with the screws that penetrated them.

The assembly of the feeder did not allow me to replace the broken parts without taking the bird feeder completely apart, because some of the parts were glued together and could not be disassembled without breaking.

I began designing a third bird feeder that summer, by addressing the problems previously presented by the first two feeders along with new innovations such as the center bin separator. This device divides the single seed chamber into two chambers and through the process of assembly creates an internal support system that would later prove to be a significant and substantial part of the bird feeder and how it functions. I also added two chimneys to fill the separated bins with different seed.

I began by correcting the problem of warped roof panels at the ridge by placing a bead of silicone along the edge of the roof panels where they make contact at the ridge. The chimneys were attached, to the roof where they make contact at the ridge with silicone. By attaching the two chimneys in this manner it keeps the roof panels at the ridge from separating and with the addition of silicone provides a solid, flexible bond that is completely water proof. It also provides structural support around the two access holes located inside the chimney that are used for filling the feeder.

The two chimneys allowed for the filling of two bins with different types of seed. The chimney caps were designed with two moisture vapor venting air channels that allowed warm moist air to ventilate to the outside. The bin separator was designed at this point, comprised of four separate pieces of plywood that completely separated the bin, thereby not allowing seed to transfer from one bin to another when its seed was depleted. However, there were still problems with this model. The assembly of the bin separator was not conducive to repair. These design problems would be resolved in the final invention and would embody these designs.

This birdfeeder was designed and invented by me in response to existing problems of outdoor bird feeders that were being marketed and contained elemental flaws. The majority of the wild bird feeders on the market were of poor quality and lacked the structural integrity to survive the effects of the sun, wind, rain, freeze thaw cycles, the occasional lawn sprinkler over an extended period of time, up to years due to their material composition. A lot of the bird feeders had strings that penetrated their roofs and allowed water to access the seed and rot. I bought 3 of those stupid models that fed finches. The final design would address and correct these flaws.

Water vapor is the major seed contamination and problem with feeding birds. Hanging or suspended feeders often have their attaching mechanism penetrating the seed bin, thus contaminating the seed. By mounting my feeder on a post or pole solved this problem. By the nature of their construction some feeders have seams or cracks allowing water to penetrate the roof structure and directly contaminate the seed. These feeders could have had some type of caulking or be designed in a fashion that would not allow water or moisture to penetrate the seed storage area. Adding silicone to where all parts that joined each other on the roof structure would solve this problem, which I did. The feeders I saw that approached this water and moisture problem did not address air ventilation and condensation, which can be a severe problem when outdoor temperatures fluctuate. Another design flaw is the hinged roof for easy filling. It was easy to fill yet every time it rained the water would run into the seed bin through the hinge and I would have to replace the seed. "Lexan" or plastic sided bird feeders have the problem that the clear plastic the manufacture uses breaks down in sunlight very quickly rendering it brittle. My friend has several of this type that he makes and replaces his plastic every couple of years. He said that the birds would peck at the seed behind the clear plastic and therein crack the plastic. I wanted to design a bird feeder that was esthetically pleasant and last for a good five years, be able to replace the parts that could get ruined and address the above problems.

The platforms or perches are not large enough and only a few birds can feed at one time. Bird seed platforms often can't facilitate and support large wild birds such as quail, young pheasants, large woodpeckers, etc. The platforms or perches that I saw were primarily made of metal, plastic and wood. Metal bases and perches conduct both heat and cold, which can cause damage to a bird's feet. Plastic also has these qualities, yet to a lesser degree. Wood is natural and exhibits stable properties when affected by hot and cold cycles. I would use wood perches and furthermore I would use wood branches for perching and containing seed on the seed platform thusly solving the problems of heat and cold on their feet. Most perching birds perch on branches in the wild, so why not here.

Often only one type or size of seed can be dispensed at a time and seed flow could not be regulated. By installing a bin separator in the seed chamber I created two separate seed containment chambers along with two chimneys for filling and two chimney caps for weather protection. Furthermore two seed access ports were added to the already existing two ports and seed regulators were designed to limit the flow and size of the seed being dispensed. These additions corrected the above problems.

An innovative and integral part of the birdfeeder is called the bin separator, which allows the forces of expansion and contraction to be exerted in a manner that holds securely all of the associated parts in their relative position. By the virtue of the its design, it allows the feeder to be assembled, disassembled and or parts replaced with minimal skills and tools.

Furthermore when a specific part is damaged or needs to be replaced and is removed from the feeder, the feeder will always maintain its structural form and integrity. The composition of the related parts, that would require repair or replacement, is manufactured from ⅝-inch exterior grade plywood that is readily available.

Bird feeders are hard to fill. In many of the stores that sell bird feeders and seed I quite often saw for sale a variety of scoops available for filling bird feeders which would require a multitude of scooping seed to fill because of their size. Many feeders are filled from the top, incorporating a variety small sliding access filling ports, hinged roofs and those bird feeders that must be removed from their stands or supporting devices. While some feeders must have their roofs removed by sliding their roofs up support lines or strings with one hand and using the other hand to hold a pail of seed and scoop the seed into the feeder while hanging from these supports. It would then be worth while and more safe to remove the feeder and fill on a bench or ground. This result in all of above scenarios is wasted and spilled seed and the potential for people to become injured.

A vast majority of bird feeders do not come in kit form. Bird feeders get broken and replacement parts are difficult to obtain for repairing them, if not impossible. This bird feeder was designed with the ability to be sold in kit form however that was and is not my intention of claims.

BRIEF SUMMARY OF THE INVENTION

Wild bird feeders on the market appear to represent four basic categories of composition; wood or wood products, plastic, metal and or, a composition of materials.

My bird feeder is a wood product comprised primarily of exterior grade plywood for the most part, with two solid pieces of wood, metal screw fasteners, exterior wood glue, silicone, stain and tongue oil which is available at any hardware or lumber store.

The bird feeders roof, chimneys and chimney caps are completely water resistant, when properly treated and whereas the roof covers the seed platform that is inside the roofs drip line. This prevents seeds from molding due to weather conditions such as rain and snow. When driven water and snow and the occasional lawn sprinkler soaks the seed platform the seed platform will warp down from its horizontal plane thusly allowing any further water/moisture from contaminating the seed and running off the seed platform edges past the perches. The physics behind this is when wood absorbs moisture it expands. With plywood this more noticeable because of the way the laminations of wood are placed. When the moisture or water is drying the plywood seed platform will conform to its original shape and configuration.

My bird feeder is large enough in size to accommodate over two gallons of loose fill bird seed and having the capacity of supplying two different types of seed due to two independent seed storage bins that is divided by a bin separator. The method of filling the bird feeder with seed or grain is accomplished by using the hollow chimneys internal passageway and employing a seed delivering device such as an empty plastic one-gallon milk container or any container having the same properties. Filling the feeder is easy, as the inside dimensions of the chimney are such as to accept the dimensions of a one-gallon plastic jug's neck The troubling and bothersome methods of filling a bird feeders and spilled seed are solved by my method of using a plastic one-gallon container and inserting its pour spout into a chimney that allows the seed to fill the feeder. Very little seed is wasted in this process in relationship to the volume of seed that can be delivered to the seed bins.

My bird feeder contains four seed access ports and four moveable, adjustable seed regulators. Seed can be regulated at any one or all four seed access ports.

Each solid wood chimney cap incorporates two moisture vapor venting air channels that provides airflow around and through the contained seeds and covers the chimney. These problem methods of filling a bird feeders and spilled seed are solved by my method of using a plastic one-gallon container and inserting its pour spout into a chimney that allows the seed to fill the feeder. Very little seed is wasted in this process in relationship to the volume of seed that can be delivered to the seed bins.

The birdfeeder is comprised of new structural innovations, such as the center bin separator. This device divides the single seed chamber into two separate chambers and through the process of assembly creates an internal support system that proves to be a significant and substantial part of the bird feeder and how it functions. The bin separator's function is to push outwardly and separate the side panels and feeder throats in a fashion that forces the side panels and feeder throats to interlock because of there relationship to each other. This also keeps the side panels and feeder throats in alignment with each other thereby maintaining a sound fit along that line where the side panels and feeder throats contact each other. This system allows for complete expansion and contraction of the feeder, provides considerable strength and allows for different types of seed to be dispensed at one time. Its associated component parts and two screws that are easily accessible from the outside of the bird feeder hold the bin separator in position. Above all the bin separator divides the bin into two separate seed containment areas allowing different types of seed to be dispensed at one time.

For mounting the birdfeeder it is recommended that it be post mounted approximately six feet from the ground If the bird feeder is hung by ropes, wires or chains you would probably more than likely have to penetrate the roof structure with a hole, thusly contaminating the seed with moisture and water therein defeating the reasoning why you built it to be water resistant.

DETAILED DESCRIPTION OF THE INVENTION

Figure 1:
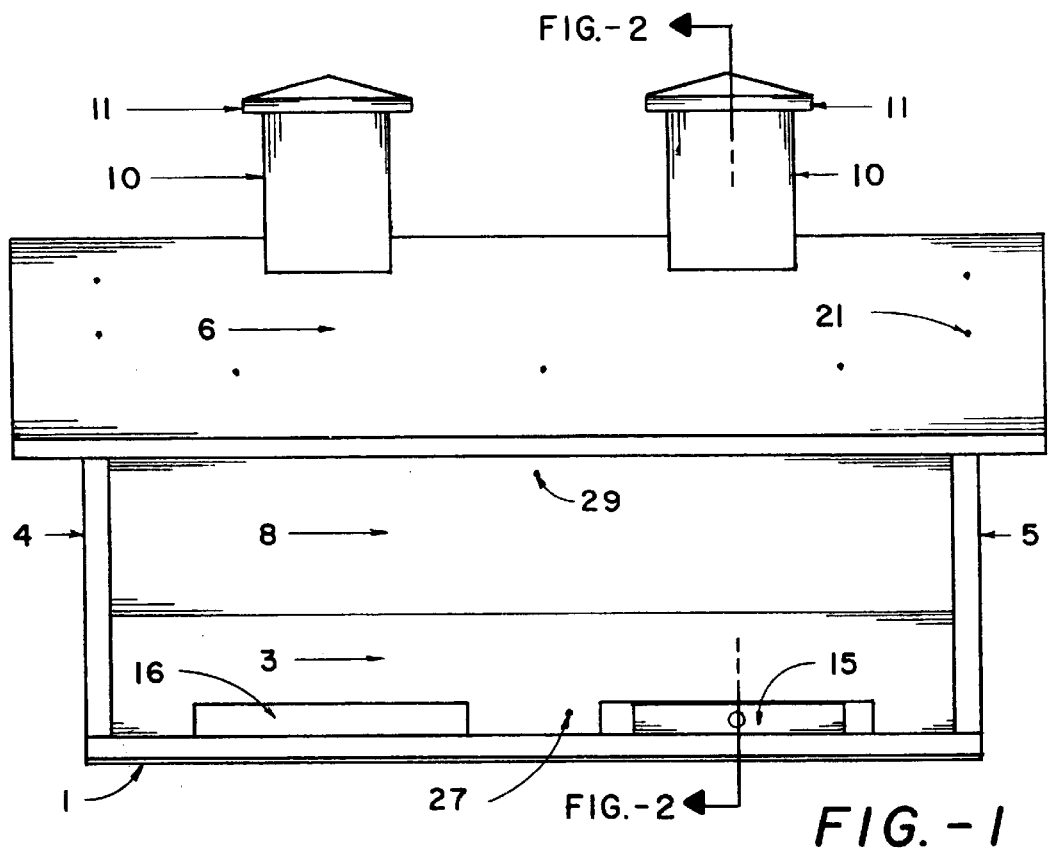
FIG. 1 is a side elevational view showing: chimneys, chimney caps, roof panel, end walls, side panel, feeder throat, seed regulator, seed ports, seed regulator knob, seed platform and fasteners along with their relationship to each other and relative locations. Also shown is the view plane for figure number two. Perching dowel or stick is not shown for clarity.

Referring to the drawings provides a bird feeder that supplies loose fill seed in a regulated manner and thusly by the virtue of its design provides shelter.

The following description is viewed from the perspective of assembly and will chronicle in a step by step manner the assembly process showing all component parts, composition of materials, measurements and specifics as required.

Unless noted all wood component parts are manufactured from ⅝ inch, exterior grade wood veneers. Unless noted all screws are stainless steel, self tapping, 2" long, square drive, "wood trim head screw" utilizing a square drive number 1 drive bit. All silicone is aquarium grade. All glue is water resistant.

Step 1

Assembling end Panels to the Seed Platform.

Seed platform (1) is comprised of ⅝-inch thick exterior grade plywood measuring 20¹¹⁄₁₆ inches long by 11⁵⁄₁₆ inches wide. The seed platform has two notches cut into the 11⁵⁄₁₆-inch wide ends that are ⅝ inches deep by 4⁵⁄₁₆ inches long and are centered on the seed platform.

The seed platform is where the many birds eat seed that is protected by the roof and end panels and sometimes the is socializing and drinking beer that they stole from the carpenter ants. Do you know how to tell if there are carpenter ants around ? Just look for the tiny empty beer cans scattered about. The seed platform is large enough to hold 8 quail or two grouse.

Figure 2:
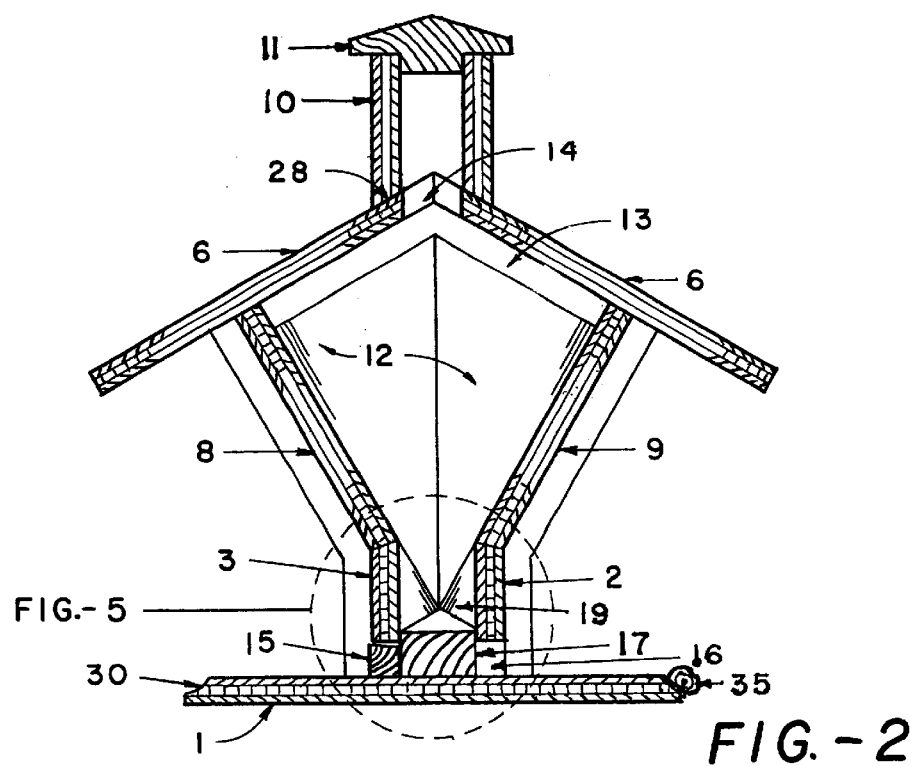
FIG. 2 is a sectional view showing: chimney cap, chimney, roof panels, seed filling opening, air channel above bin separator, bin separator, side panels, feeder throats, end panel, throat keepers, seed regulator, anchor block, seed access port, dowels or sticks and seed platform along with their relationship to each other and relative locations. Also shown is the exploded sectional view plane for figure number 5.

In FIG. 2, the 20¹¹⁄₁₆-inch long sides of the seed platform have concave routered edges (30), bilaterally with a radius of ½ inch. This groove is continuous from end to end to receive wooden dowels or wood sticks (35) that will act to keep seed on the feeding platform and provide a natural perch for the birds.

End panels (4) and (5) are mirror images and are comprised of ⅝-inch exterior grade plywood measuring an overall height of 11⁷⁄₁₆ inches with an out to out maximum width of 10 inches. Looking at FIG. 3 with the end panel (5) in this position, the bottom edge that fits into the seed platform recess is 4⁹⁄₃₂ inches wide. The outside edges extend vertically at 90 degrees a distance of 3⁷⁄₁₆ inches to a point that continues 30 degrees from perpendicular and outwardly, along the outside edge, a distance of 5¹³⁄₁₅ inches then continuing from this point along a line, that is parallel with the seed platform, extending 30 degrees towards the inside a distance of 5¹³⁄₁₆ inches wherein said edges form the a peak.

Figure 3:
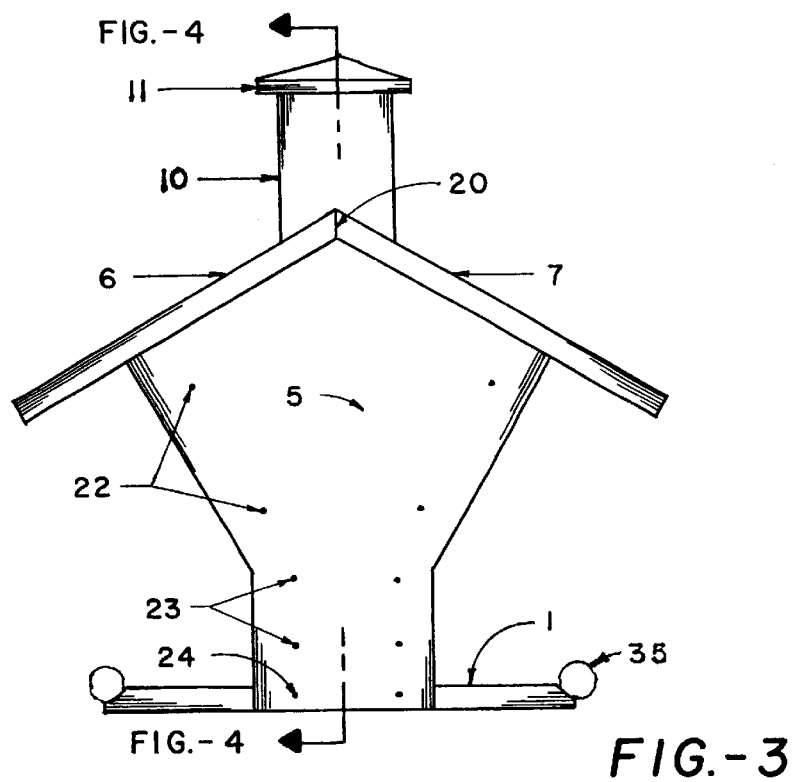
FIG. 3 is a end elevational view showing: chimney cap, chimney, roof panels, end panel, perching dowels or sticks and fasteners along with their relationship to each other and relative locations. Also shown is the sectional view plane for figure number 4.

In FIG. 1, locate the two corresponding end panels (4) and (5) along with the seed platform (1). They are inserted vertically into the notches cut into the seed platform (1) and must be even with the bottom of the seed platform as depicted in (FIG. 3). Once in position, drill a ³⁄₃₂-inch pilot hole through the pre-drilled end panels (4) and (5) into the seed platform in two places each. Secure with screw (24) in two places each, (see FIG. 3). These screws are temporary and will have to be removed to assemble the feeder. Do not overtighten.

Step 2

Assembling Feeder Throats to end Panels.

Feeder throats (2) and (3) are mirror images and are comprised of ⅝-inch exterior grade plywood measuring 19⁷⁄₁₆ inches long by 2⅝ inches wide wherein the edge is beveled acutely 15 degrees. The opposite 2⅝ inch wide side has two seed access ports (16) that are notched, 6⁵⁄₁₆ inches long by ¾ inch deep, cut into the feeder throat edge, bilaterally, beginning from a point 1⅛ inches in from the 19⁷⁄₁₆ inch long side (see FIG. 1). All other edges are 90 degrees to said surfaces. There are four seed access ports in the two feeder throats that will allow the seeds and grain to flow from the seed bins onto the seed platform for the birds to eat. In FIG. 2 locate the feeder throats (2) and (3). The feeder throats will be placed between the end panels (4) and (5) (see FIG. 1), with the 15 degree beveled edge facing up and the beveled edge sloped to the outside. It is important that the feeder throats rest securely against the seed platform (1), and the seed access ports face the seed platform. Beginning with feeder throat (2), place the outside face feeder throat a distance of 7/8 in from the outside line of the end panel (4). Temporarily clamp the feeder throat between the end panels in position, (see FIG. 5). Once in position, drill a 3/32-inch pilot hole through the pre-drilled end panel (4) into the feeder throat (2) in two places. Secure with screw (23) in two places, (see FIG. 3) for location. Remove the temporary clamp. Now position the outside face of feeder throat (2) a distance of 7/8 inch in from the outside line of end panel (5) held again by the temporary clamp. Once in position drill a 3/32 inch pilot hole through the pre-drilled end panel (5) into the feeder throat in two places. Secure with screw (23) in two places, (see FIG. 3) for location.

To attach feeder throat (3) to end panels (4) and (5), follow the steps as listed above.

The primary function of the feeder throat is to dispense seed through the four seed access ports. It's other functions include attachment to the anchor block that secures the seed platform in the center of the bird feeder, providing access for air to move through the seed access ports into the seed bins where it is heated by the sun striking against the outside of the feeder throat and transmitted to the inside and expelled out the top through the moisture vapor venting channels located in the chimney cap.

Step 3

Assembling Side Panels to end Panels.

Side panels (8) and (9) are mirror images and are comprised of 5/8-inch exterior grade plywood measuring 19 7/16 inches long by 6 1/8 inches wide wherein the edge is beveled acutely 15 degrees. The opposite 6 1/8 inch edge is 90 degrees to its face as are all other edges. In FIG. 2, locate the side panels (8) and (9). The side panels will be placed between the end panels (4) and (5) (see FIG. 1), with the beveled edge facing down and the short side of the bevel facing towards the outside. . Beginning with side panel (8), place it a distance of 7/8 inch in from the outside line of the end panel (4), by attaching a 7/8 inch spacer block with locking pliers or a clamp. Place the exterior of side panel (8) against the spacer, making contact with the feeder throat (3) along the beveled edge of the feeder throat, so that the beveled edges will fit tightly with no gaps. The top of side panel (8) should not extend above the end panels. If the side panel does extend above the end panel, rotate the side panel inward until the top of the side panel and the end panel are flush. If side panel (8) rotates inward by more than 1/8 of an inch, the feeder throat is not in its proper position or is not making contact with seed platform 1 and will have to be moved to its correct position.

Once in position, attach a temporary clamp to the end panels to hold side panel in position. Drill a 3/32-inch pilot hole through the pre-drilled end panel (4) into the side panel (8) in two places. Secure with screw (22) in two places (see FIG. 3) for location. Remove the temporary clamp. Now position side panel (8) a distance of 7/8 inch (using the spacer block) in from the outside line of end panel (5). Once in position attach a temporary clamp to the end panels to hold side panel in position. Drill a 3/32-inch pilot hole through the pre-drilled end panel (5) into the side panel (8) in two places. Secure with screw (22) in two places (see FIG. 3) for location. Remove the temporary clamp.

To attach side panel (9) to end panels (4) and (5), follow the steps as listed above.

When and if moisture is present in the seed bins it's other function, besides retaining the seed, is to transmit internally the heat that is generated by the sun that strikes its outside walls thusly aiding in the removal of the moisture laden air in the seed bins.

Step 4

Remove the four temporary screws that are holding the end panels (4) and (5) to the seed platform. Remove the assembled carcass and set aside the seed platform. In this position proceed to step 5.

Step 5

Assembling the Bin Separator

The bin separator (12) is comprised of two pieces of 5/8-inch exterior grade plywood that are glued together. Referring to FIG. 2, the line created by the two joined pieces of plywood, is perpendicular to the seed platform. From this distil point, continue a distance of 7 inches at 30 degrees of perpendicular. Continuing from this point along a line, that is parallel with the seed platform, extending at 30 degrees towards the inside a distance of 4 1/16 inches wherein it joins the opposite side to form a peak.

The bin separator divides the seed chamber into two separate seed holding chambers and allows different types of seeds or grains to be dispensed at the same time.

An innovative and integral part of the birdfeeder is called the bin separator, which allows the forces of expansion and contraction of the side panels and feeder throats to be exerted in a manner that holds securely all of the associated parts in their relative position and is secured in place with two screws and the throat keepers. Furthermore when a specific part is damaged or needs to be replaced and is removed from the feeder, the feeder will always maintain its structural form and integrity due to the design and location of the bin separator. By the virtue of its design, it allows the feeder parts to be replaced with minimal skills and tools. The composition of the related parts, that would require repair or replacement, is manufactured from 5/8-inch exterior grade plywood that is readily available.

In FIG. 2, locate the bin separator (12). The bin separator is comprised of two pieces of 5/8 plywood that are glued together. Position the separator into the bin, so that the longest edges are against the side panels (8) and (9). Place the bin separator at a point that is equal distance between the end panels thereby creating two seed chambers. Once in position, the bin separator should be firmly pressed downward by hand, along the inside walls of side panel (8) and (9). This action will push the side panels outwardly to a point where the motion of the side panels is stopped by the top edge of the feeder throats where they make contact along a horizontal line extending from the end panel (4) to end panel (5). There should be no gaps between the feeder throats and side panels where they meet. If there are gaps, simply tap into position the feeder throat or side panel with a small hammer while continuing to press down on the bin separator. Drill a 3/32-inch pilot hole through the pre-drilled hole of side panel (8) and side panel (9) into the bin separator (12). Secure with screw (29) in two places (see FIG. 1) for location. There now exists an air channel (13) at the top of the bin separator allowing air to transfer between the two bins and let warm air rise up through the seed filling openings areas (14) into the chimneys. The air eventually exits through the chimney cap to the outside atmosphere, (see FIG. 2).

Place the carcass on its side for the next step.

Step 6

Installing the Throat Keepers

Throat keepers (18) and (19) are triangular and are comprised of 5/8-inch exterior grade plywood. The long side or hypotenuse is 1 9/16 inch long with the other two sides being 3/4 of an inch and 1 1/4 inches.

Figure 5:
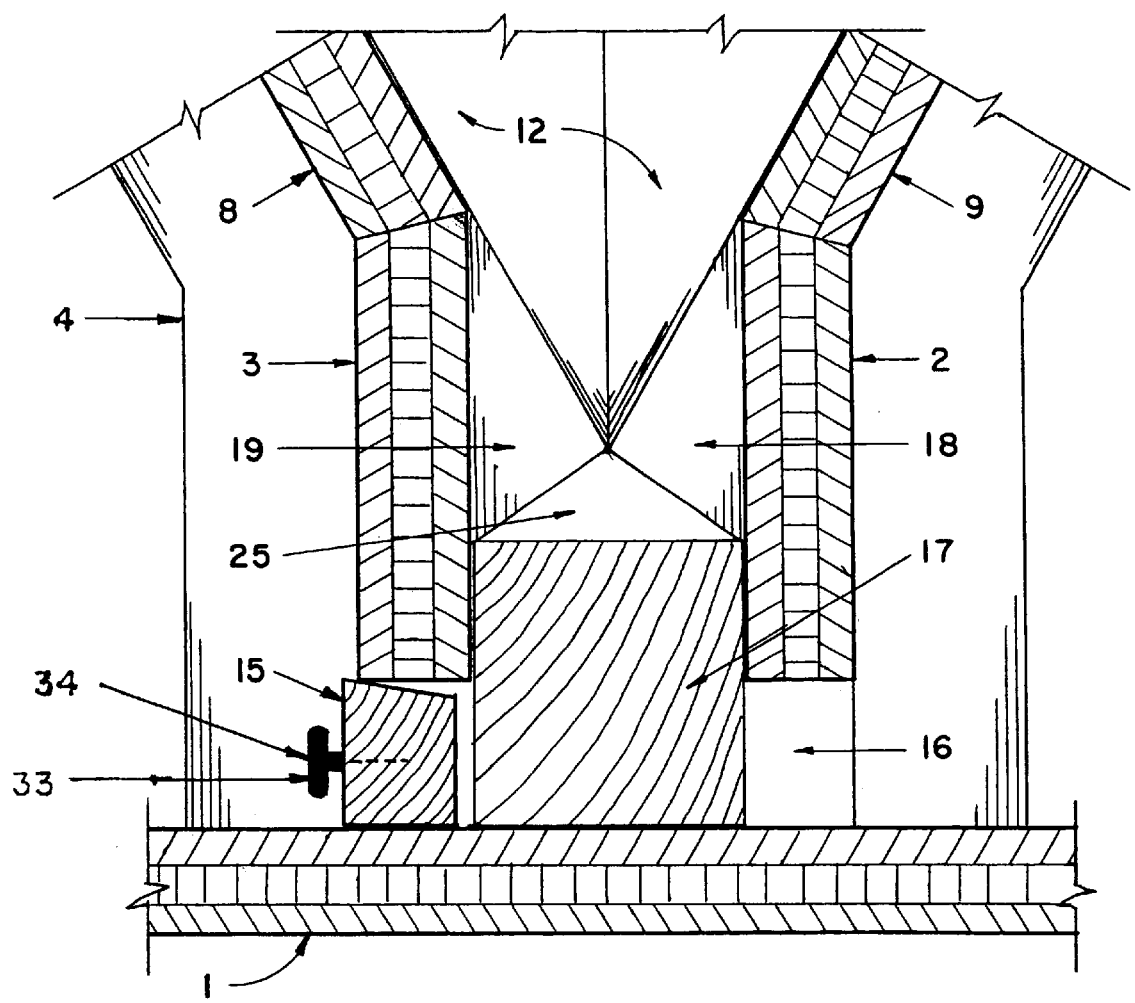
FIG. 5 is a detailed sectional view showing: bin separator, throat keepers, throat keeper space, side panels, feeder throats, end panel, seed access ports, seed regulator, seed regulator knob, seed platform and fasteners along with their relationship to each other and relative locations.

In FIG. 5, locate throat keepers (18) and (19). Orient both throat keepers so that the longest side of the throat keeper is placed against the feeder throat. In this position the throat keepers also contact the bin separator and the center block. Place a thin film of exterior; water proof glue on the edge of throat keeper (18) that contacts the bin separator (12). Press firmly on the throat keeper until firm contact is made against the inside wall of feeder throat (2) and bin separator (12). The throat keepers will push the feeder throats (2) and (3) outward until they make firm and equal contact with the beveled edges of the side panel (8) and (9).

To attach throat keeper (19) to the bin separator (12), follow the steps as listed above.

The throat keepers apply a force outwardly against the inside walls of the feeder throats thereby compressing the joint between the feeder throat and the side panel without the need of fasteners so that they may expand and contract. By not fastening the feeder throats and throat keepers together said throats and keepers will not misalign themselves. The throat keepers are secured in position by waterproof, water-based glue applied to the plywood edges where the bin separator and the throat keepers touch providing a fixedly secured joint. The throat keepers are also kept in position by the upward force of the anchor block where it contacts the throat keepers along the inside wall of the feeder throats. In this configuration an open space (25) (see FIG. 5) is created between the anchor block and the throat keepers allowing seed from a seed bin with seed to flow into the empty seed bin thusly allowing all seed access ports to feed birds. When both seed bins contain seed the pressure from the seeds through the open space is neutralized and only the seed in that seed chamber will supply its respective seed access ports.

Hold the throat keepers in position until the glue starts to set. The pressure of the feeder throats will hold the throat keepers in position long enough to allow time to complete step 7. Before the glue dries move quickly onto step 7.

Step 7

Installing the Anchor Block

The anchor block (17) is a rectangular piece of solid wood and measures 1 1/2 inches in height, by 1 5/16 inches wide and is 3 inches long.

The anchor block secures the feeder throats and the seed platform in the center of the bird feeder with a large screw through the bottom of the seed platform. This anchor block also keeps the feeder throats separate, secures in position the throat keepers and thusly helps to make the seed platform fit tightly against the bottom of the feeder throat.

In FIG. 5, locate the anchor block (17). Place the anchor block length wise between the feeder throats (2) and (3) at a point directly centered on the throat keepers (18) and (19) and corresponding bin separator (12), (see FIG. 4) for location. To make a snug and tight fit the anchor block is to be installed with the 1 9/16 side against the feeder throats. With a hammer lightly tap against the anchor block driving it inward until it makes contact with the throat keepers. At this point, continue to adjust the anchor block with your hammer until the anchor block is even or level with the bottom of the feeder throats. Once in position attach a temporary clamp on the feeder throats to hold the anchor block in place. Drill a 3/32-inch pilot hole through the pre-drilled feeder throat (2) into the anchor block in one place. Secure with screw (27) in one place (see FIG. 1) for location. Correspondingly secure the pre-drilled feeder throat (3) in the same fashion with screw (27) in one place. Remove temporary clamp.

By securing the anchor block in position we have assembled the main carcass of the bird feeder.

By the configuration of the throat keepers and the anchor block an open space (25), (see FIG. 5) is created. This open space allows loose fill birdseed to flow freely from one bin into the other bin. When a bin has been depleted of seed and the other bin contains seed, the seed will flow into the empty bin and be dispensed by all four feed ports. This feature assures that the maximum seed dispensing area is utilized even if one bin has no seed in it. If two different types of seed are used and placed in their perspective bins and one bin is depleted of seed, the full or partially full bin will dispense seed through this opening and out through all four ports. By filling the empty bin with seed, the force of the opposing seed will be neutral. Once again each bin will dispense its seed from its perspective feed ports (16), (see FIG. 1).

By placing all the component parts of the carcass in their relative positions, a multitude of forces and situations come into play and are unique to this design.

1. Mechanical fasteners are not used to attach the side panels and the feeder throats to each other and therefore act independently allowing for expansion and contraction.

2. The side panels are held in position by the force of the bin separator pushing against the inside plane of the side panel. The position of the bin separator is secured by a screw, located in the center of the side panel at the top. By securing the bin separator in this location, with a single screw, it will provide the optimum expansion and contraction ranges necessary for plywood.

3. By gluing the throat keepers to the bin separator and securing the throat keepers in position by the anchor block we have created an integrated structural system.

4. The throat keepers apply a force outwardly against the inside wall of the feeder throat thereby compressing the joint between the feeder throat and the side panel.

5. The anchor block is secured in position by two screws that pass through the pre-drilled holes in the feeder throat and into the anchor block. The location of the screws is offset so that the anchor block will not rotate.

The anchor blocks function is to provide an anchorage point for the throat keepers, feeder throats and the seed platform thereby allowing the plywood to expand and contract without degradation to the fasteners and wood.

Step 8

Installation of Carcass to Seed Platform

Place seed platform (1) on a level surface and insert the end panels (4) and (5) of the carcass into the notches in the seed platform. The two end panels of the carcass should be perpendicular and level to the seed platform (see FIG. 3). No pre-drilling is necessary as this function was performed in step 1. Secure the end panels (4) and (5) using screw (24) in two places each (see FIG. 3).

Figure 4:
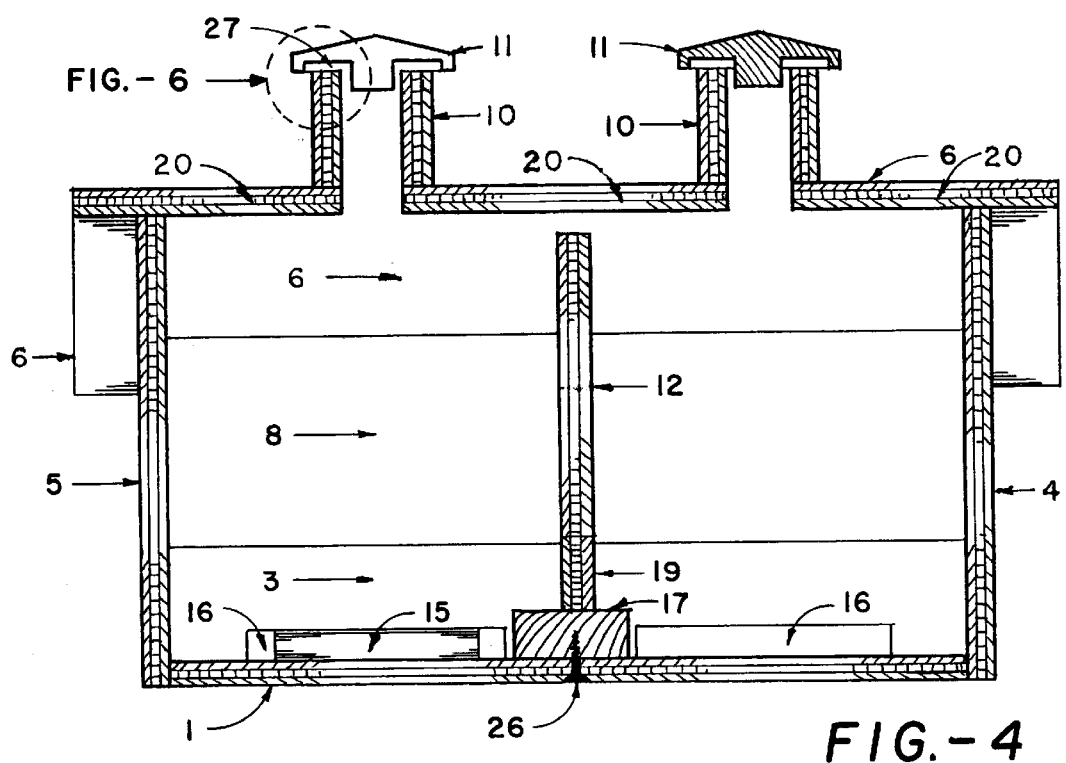
FIG. 4 is a sectional view showing: chimney caps, chimneys, roof panel, end panels, side panel, feeder throat, seed regulator, seed access ports, throat keeper, anchor block, seed platform, roof panels silicone sealing joint and fasteners along with their relationship to each other and relative locations. Also shown is the sectional view plane for figure number 6, denoting moisture venting channel.

Turn the bird feeder on its side and locate in FIG. 4, screw (26). This screw is a No. 10, phillips, bugle head, and is 2 inches in length and is made of brass. Drill a 3/32-inch pilot hole through the pre-drilled seed platform and secure the seed platform to the anchor block with screw (26) until the seed platform makes firm contact with the bottom of the feeder throats.

Place the bird feeder in an upright position for the next step.

Step 9

Installation of Roof Panels

Roof panels 6 and (7) are mirror images and are comprised of 5/8-inch cabinet grade exterior plywood measuring 23 11/16 inches long by 8 11/16 inches wide, at the long point. One long edge is beveled at 30 degrees and all the other edges perpendicular to each other. The beveled edge has two notches that are cut in a semicircle with a radius of ¾ of an inch beginning at a point from the outside edge inward a distance of 6 inches, to center from both ends. The semicircles are cut so that they are perpendicular to the 60-degree roof edge.

The roof panels come together at their beveled edges forming a sloping roof structure that is water resistant due to the silicone that is applied to the beveled edges to form the peak. Silicone is not only an excellent water proofing membrane it is also a very good adhesive. The roof covers the entire bird feeder with its outside edges forming a water drip line over and past all of the end panels and outside edges of the seed platform and perches. The roof is attached to the end panels and side panels with screws and makes the associated members an integral unit that is strong and durable. The roof is coated with exterior grade tongue oil and stain that makes a water resistant roof structure.

In FIG. 3, locate roof panel (6) and (7). Both roof panels have beveled edges that will be positioned so that they make contact with each other, forming a ridge, and the beveled edges form a tight fitting union. Place the roof panel (6) on the two-end panels and side panel (8), so that short side of the beveled angle is placed at the peak of the two end panels. Further position the roof panel lengthwise, equal distances from the outside face of the end panels (see FIG. 4) for location. Place the corresponding roof panel (7) in position with the beveled edges making contact at the ridge. Check to make sure both roof panels do not have noticeable gaps where they join. If gaps exist along the peak, re-position the roof panels, up and down, so that a tight fit of the two panels at the peak is achieved. Temporarily position the roof panel (6) in place, by hammering several finish nails through the roof into the end panels. Do not hammer the nails flush with the roof panel, as these nails will be removed. Drill a 3/32 inch pilot hole through only the pre-drilled roof panel (6) into the end panels and the side panel. Secure only one roof panel at a time. Secure with screw (21) in seven places (see FIG. 1) for locations. Remove the temporary finish nails from both panels. Panel (7) will not be attached to the carcass and will be set aside. Place a bead of clear, aquarium grade, silicone (20) (see FIG. 3) on the beveled edge of the fixed roof panel its entire length where it contacts the other roof panel. Smooth out the bead of silicone on the beveled edge to an even thickness its entire length. Place the opposing roof panel on the carcass and push upward towards the ridge and into position. By pushing the roof panel into position, the silicone will be evenly distributed along the two edges, at the ridge, where the two roof panels connect, insuring that the contact surfaces will be evenly coated with silicone. Drill a 3/32 inch pilot hole through the pre-drilled roof panel (7), in 7 places, and secure with screw (21) in seven places each. At this time do not try and remove the excess silicone from the peak. The silicone should cure enough in 60 minutes so that it may be cut off with a razor knife and discarded. Clean any excess silicone from the inside of the two chimney seed filling openings that are located along the peak.

Step 10

Installation of the Chimneys

Overview:

The two chimneys (10) are pre-manufactured and supplied as a complete unit. The chimney is comprised of ⅝ inch exterior grade plywood and manufactured from four rectangular pieces of plywood measuring 2⅛ inches wide by 3⅝ inches long. All edges that are 3⅝ inches long are beveled 45 degrees, so that when assembled, will form a rectangle. The beveled pieces are assembled using glue and nails. Once assembled the chimneys are cut from one end, on two planes, which correspond with the roof panels angles, a total of 60 degrees. When assembled the chimney will be 2⅛ inches square on the outside and 3⅝ inches long with the interior area of the chimney being 1 7/16 inch by 1 7/16 inch square. After drying the chimney is cut on one end so that it will fit on the roof. The chimney is cut along the two, 30 degree, planes created by the roof panels (see FIG. 3). The cuts in the chimney will be of equal depth so that where the cuts intersect, in the middle of the chimney, they will fit snugly on the roof panels at the ridge with no gaps.

In FIG. 1, locate the two chimneys (10). Position the two chimneys on the roof directly over the holes at the ridge. Place silicone (28) (see FIG. 2 for location) on the angled cuts of the chimneys, where they make contact with the roof panels and smooth out the silicone to an even thickness being sure to cover all contact surface areas. Position the chimneys directly over the access holes, and being in alignment with the ridge, press the chimneys firmly onto the roof structure (see FIG. 4 for location). Do not attempt to remove the excess silicone until it dries. Once the silicone is dry use a utility knife to remove the excess from around the outside of the chimney. To attach the other chimney (10) follow the steps as listed above.

The chimney is now an important functional feature to the design of the bird feeder. The inside chimney dimensions of 1 7/16 inch by 1 7/16 inch will allow, with a tight fit, the open end of a common plastic milk jug (or the plastic jugs that loose bird seed is commonly supplied in) to be inserted for filling. The jug that is filled with birdseed is inverted into the chimney so that the neck protrudes inside, and the shoulders of the plastic container rest on the top of the chimney. The seed will now flow freely into the bird feeder bin. Once the jug is in this position you may release the jug while it is filling the bird feeder, as the weight of the seed and the tight fit between the plastic jug neck and chimney combine to make the process of filling the feeder a "hands off" operation. Filling is rapid, with little seed waste and when the seed is finished flowing into the bird feeder the jug will fall off the chimney. This design, utilizing a plastic jug, lends to the overall function of this type of bird feeder that was designed with the concept of feeding large wild birds, and having the ability to feed 8 quail at a time or a multitude of smaller birds. This design further makes filling the bird feeder safer when the feeder is fixed or mounted high on a pole or suspended from a tree branch that is out of reach. This design lessens the chance of accidentally injuring ones self from falling off a ladder while filling the feeder. Furthermore the chimneys are stained on the outside and a coating of tongue oil is applied making the chimneys a water resistant unit.

Step 11

Installing the Chimney Cap

Figure 6:
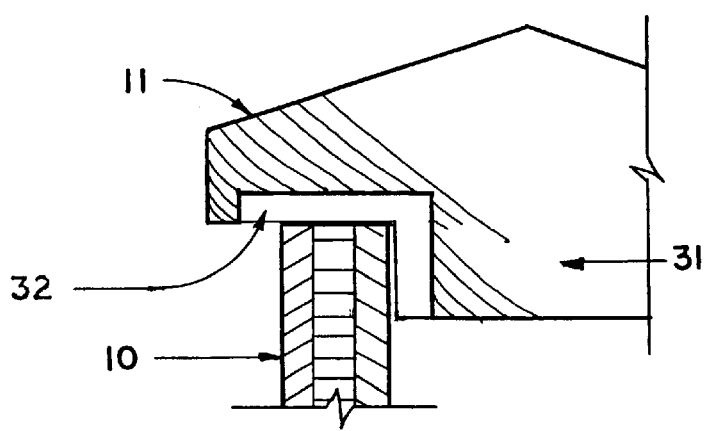
FIG. 6 is a detailed sectional view showing: chimney wall, chimney cap, moisture vapor venting air channel and chimney cap stem along with their relationship to each other and their relative locations.

Chimney caps (11) are comprised of solid wood and measure 3 7/16 inches square on the top with a stem that protrudes into the chimney and is 1 13/32 inch square. The top of the chimney cap is beveled from the outside four corners upward 12 degrees, to a point where they intersect at the apex a distance of 2⅞ inches. At the four corners the wood extends down vertically a distance of 7/16 of an inch and further continues, horizontally inward a distance of 1 inch where it forms the stem (31) (see FIG. 6). The stem is 1 13/32 inches square and sits inside the chimney a distance of ½ inch. There are two moisture vapor venting air channels (32), (see FIG. 6) that are routered into both chimney caps. The cap extends, beyond the outside line of the chimney, a distance of ⅜ of an inch. From this outside edge, a 3/16 inch moisture vapor venting air channel is cut into the cap beginning at a distance of ⅛ of an inch from the outside of the cap inwards a distance of 1 3/16 inch. The 3/16 inch moisture vapor venting air channel then extends vertical downward a distance of 1 inch inside the stem (31) (see FIG. 6 for location). The overall thickness of the wood cap, from the apex to the seed platform of the stem measures 1½ inches.

In FIG. 1, locate the chimney caps (11). Place the chimney caps on the top of the chimneys. The moisture vapor venting air channels are 3/16 inch in diameter and extend a passage from the inside of the chimney to the outside of the chimney. This design allows for the free moment of warm and possibly moisture-laden air to exit the seed bins. The free flow of air from the seed access ports up through and around the seed will maintain the freshness of the seed and not allow mold or funguses to gather on the inside surfaces of the seed bins, roof, chimney and ultimately the bird seed.

Because of this design when the sun shines on the untreated side panels and feeder throats the warm air generated, in the two seed bins, will move upward into the chimneys and will exit via the chimney cap moisture vapor venting air channels, further suppressing the growth of mold and funguses. The chimney caps having two moisture vapor venting air channels will always allow the air to move freely out of the bird feeder to the outside atmosphere.

If only one air channel were provided in the chimney cap it would be possible to orient the chimney cap so that the single channel could be facing into the wind. The wind could create a positive pressure in the vent hole and would not allow the warm air to escape to the outside thusly defeating the purpose and reasoning for having a vent hole. By installing two air channels this negates the possibility of said scenario from occurring.

Step 12

Installing the Seed Regulators

Note; only one seed regulator is shown for graphic clarity. The feeder can accommodate up to four seed regulators at a time.

Seed regulators (15) are comprised of ¾-inch solid wood measuring 13/16 of an inch, to the long point, in height and are 5 inches long. One edge, on the long side of the regulator, is beveled 30 degrees for a distance of 5 inches. The seed regulators also have attached to them a wooden seed regulator knob (33), with a no. 18 phillips head wood screw (34) imbedded in the center of the knob therein attaching it to the seed regulator. This knob allows the regulator to be moved easily for any adjustments that may be required for the dispensing of different types of seed. The beveled edge of the regulator is placed so that it is facing up, and makes contact with the feeder throat and seed access ports (see FIG. 5). It is possible to obtain a multitude of configurations for dispensing seed by sliding the regulator laterally and securing into position by pushing the seed regulator into the opening therein pinning the seed regulator against the seed platform and the uppermost edge of the seed access port.

It is to be known and understood that the present invention is not limited to the sole embodiment described above, but encompasses any and all embodiments within the scope of the herein-contained claims.

What I claim is:

1. A bird feeder assembly, comprising:
   a seed platform configured to attach to a post, the seed platform having a plurality of concave edges configured to receive one or more edge members;
   a plurality of end panels, wherein each of the end panels is secured to the seed platform;
   a plurality of side panels, wherein each of the side panels is secured to at least one of the end panels;
   a plurality of feeder throats, wherein each of the feeder throats is secured to at least one of the end panels, and wherein each of the feeder throats has at least one access port that includes a seed regulator;
   a bin separator located bilaterally between at least two of the end panels, the bin separator fixedly secured to at least one of the side panels;
   at least two throat keepers, wherein each of the throat keepers is secured to the bin separator;
   an anchor block secured to the seed platform and the feeder throats;
   a plurality of rectangular roof panels, wherein each of the roof panels is fixedly secured to at least one end panel and at least one other of the roof panels;
   a plurality of rectangular chimneys, wherein each of the chimneys is fixedly secured to at least one of the roof panels; and
   a plurality of square chimney caps, wherein each of the chimney caps fits into and over one of the chimneys in one-to-one correspondence.

2. The bird feeder assembly of claim 1 including no more than two each of the roof panels, the chimneys, the chimney caps, the side panels, the end panels and the feeder throats.

3. The bird feeder assembly of claim 1 including exactly four each of the access ports and the regulators.

4. The bird feeder assembly of claim 1 wherein at least one of the roof panels has a filling opening and at least one of the chimneys is hollow and fixedly secured directly over the filling opening, and wherein the roof panels, the chimneys, and the chimney caps are coated with water resistant tongue oil.

5. The bird feeder assembly of claim 1 wherein each of the chimney caps is configured to include bilaterally cut air channels.

6. The bird feeder assembly of claim 1 wherein the bin separator separates the bird feeder assembly into two separate containment areas.

7. The bird feeder assembly of claim 6 wherein the bin separator is fixedly secured to the at least two throat keepers such that the side panels and the feeder throats are allowed to expand and contract while maintaining structural integrity of the bird feeder assembly.

8. The bird feeder assembly of claim 7 wherein the bin separator and the end panels are configured to be replaceable.

9. The bird feeder assembly of claim 1, 2 or 3 wherein at least one of the access ports is contained within one of the feeder throats and at least one of the seed regulators is contained within one of the access ports, wherein each of the seed regulators is shorter in length than each of the access ports, and wherein each of the seed regulators can be positioned to dispense small seeds.

10. A method for filling the bird feeder assembly of claim 1 using a delivery device containing feed and having a pour spout with a stop collar that limits the distance the pour spout can be installed, the method comprising:
   inverting the seed delivery device over the bird feeder assembly; and
   inserting the pour spout into one of the chimneys to a depth wherein the threaded stop collar contacts an uppermost portion of the one of the chimneys, the delivery device and the one of the chimneys forming a tolerance such that if the delivery device were to rotate, the pour spout would engage inside the one of the chimneys and prevent the delivery device from falling over.

* * * * *